United States Patent
Katou

(10) Patent No.: US 6,712,724 B2
(45) Date of Patent: Mar. 30, 2004

(54) BELT-TYPE CONTINUOUSLY VARIABLE TRANSMISSION

(75) Inventor: Yoshiaki Katou, Kanagawa (JP)

(73) Assignee: JATCO Ltd, Fuji (JP)

(*) Notice: Subject to any disclaimer, the term of this patent is extended or adjusted under 35 U.S.C. 154(b) by 2 days.

(21) Appl. No.: 10/128,230

(22) Filed: Apr. 24, 2002

(65) Prior Publication Data
US 2002/0160867 A1 Oct. 31, 2002

(30) Foreign Application Priority Data
Apr. 27, 2001 (JP) .................................. 2001-133658

(51) Int. Cl.⁷ .............................................. F16H 59/00
(52) U.S. Cl. .................................... 474/28; 474/18
(58) Field of Search ........................... 474/28, 18, 64, 474/70, 91; 477/48, 45, 46

(56) References Cited

U.S. PATENT DOCUMENTS

| | | | |
|---|---|---|---|
| 5,295,915 A | | 3/1994 | Friedmann |
| 6,050,911 A | * | 4/2000 | Feuchter et al. ............... 474/12 |
| 6,336,878 B1 | * | 1/2002 | Ehrlich et al. ................. 474/28 |
| 6,336,880 B1 | * | 1/2002 | Agner .......................... 474/28 |
| 6,394,920 B1 | * | 5/2002 | Morlok ......................... 474/28 |
| 2001/0031678 A1 | * | 10/2001 | Schmid et al. ................. 474/18 |
| 2001/0044350 A1 | * | 11/2001 | Nishigaya et al. ............. 474/18 |

* cited by examiner

Primary Examiner—David Fenstermacher
(74) Attorney, Agent, or Firm—Foley & Lardner

(57) ABSTRACT

A belt-type CVT is comprised of a driving pulley and a driven pulley each of which has having a transmission piston chamber and a clamp piston chamber. An effective cross sectional area of the driving-side clamp piston chamber is equal to an effective cross sectional area of the driven-side clamp piston chamber. The driving-side clamp piston chamber is fluidly communicated with the driven-side clamp piston chamber through a common passage.

15 Claims, 3 Drawing Sheets

BELT-TYPE CONTINUOUSLY VARIABLE TRANSMISSION

BACKGROUND OF THE INVENTION

The present invention relates to a belt-type continuously variable transmission (CVT), and more particularly to a belt-type CVT whose driving pulley and driven pulley are formed into a two-piston structure.

U.S. Pat. No. 5,295,915 discloses a belt-type CVT whose driving pulley and driven pulley are formed into a two-piston structure.

SUMMARY OF THE INVENTION

However, the belt-type CVT of U.S. Pat. No. 5,295,915 has a problem that it is necessary that a torque cam mechanism for controlling a belt clamping force is disposed at an end of an input shaft. This arrangement increases an axial dimension of the belt-type CVT and generates a considerable loss of a hydraulic pump.

It is therefore an object of the present invention to provide an improved belt-type CVT which ensures a high pump-efficiency without increasing an axial dimension of the CVT.

An aspect of the present invention resides in a belt-type continuously variable transmission which comprises a driving pulley having a driving-side transmission piston chamber and a driving-side clamp piston chamber; a driven pulley having a driven-side transmission piston chamber and a driven-side clamp piston chamber; an endless belt wound around the driving pulley and the driven pulley so as to transmit a driving force from the driving pulley to the driven pulley; and a hydraulic circuit controlling effective pulley diameters of the driving pulley and the driven pulley relative to the belt according to vehicle condition indicative information to continuously vary a transmission ratio of the belt-type continuously variable transmission; wherein at least one of first and second relationships is satisfied, the first relationship being that an effective cross sectional area of the driving-side transmission piston chamber is equal to an effective cross sectional area of the driven-side transmission piston chamber, and the second relationship being that an effective cross sectional area of the driving-side clamp piston chamber is equal to an effective cross sectional area of the driven-side clamp piston chamber; wherein one of third and fourth relationships is satisfied, the third relationship being that a common passage of the hydraulic circuit fluidly communicates the driving-side transmission piston chamber and the driven-side transmission piston chamber, the fourth relationship being that the common passage fluidly communicates the driving-side clamp piston chamber and the driven-side clamp piston chamber.

DETAILED DESCRIPTION OF THE INVENTION

Figure 1:
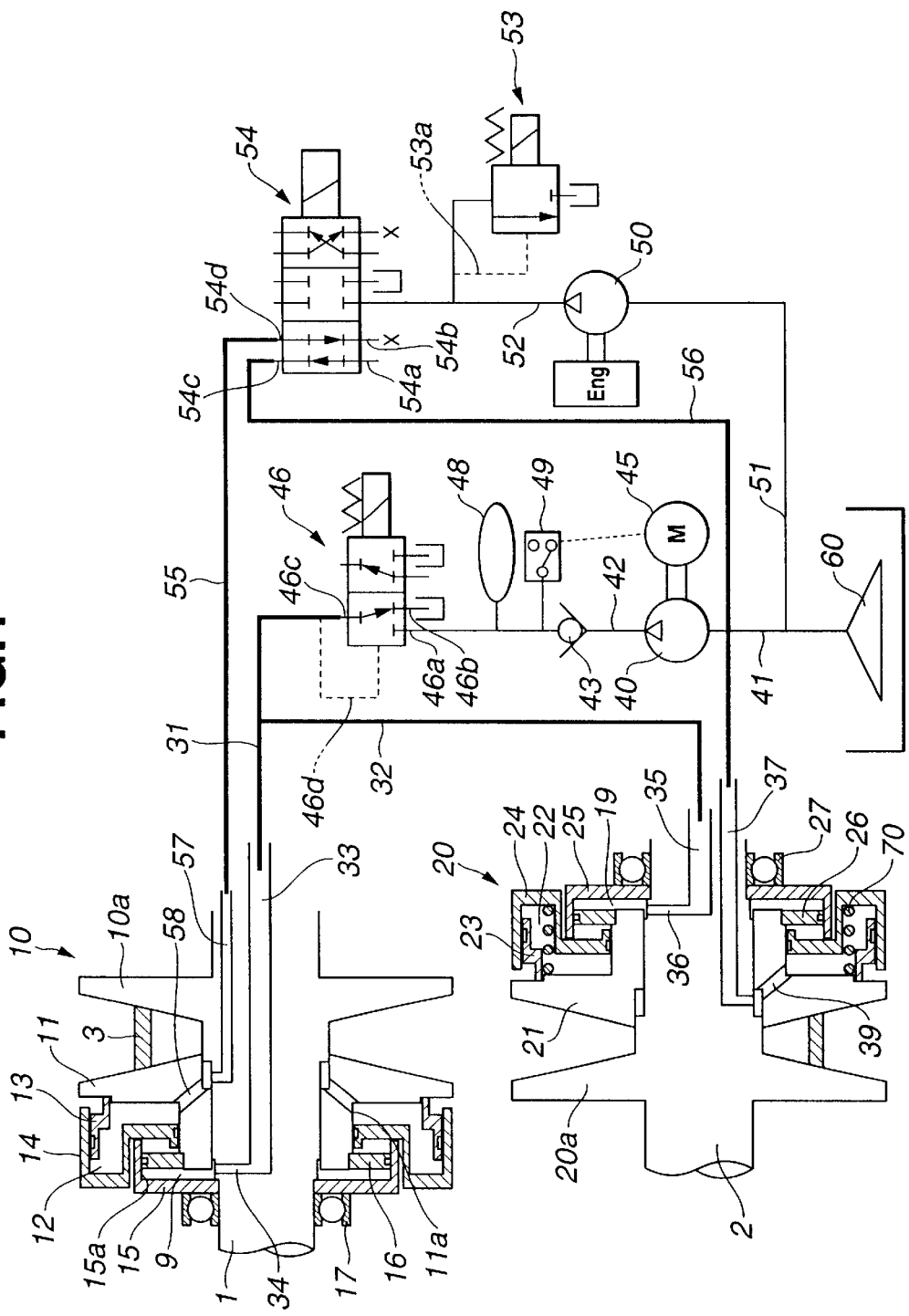
FIG. 1 is a hydraulic circuit diagram showing a control system of a belt-type continuously variable transmission (CVT) according to a first embodiment of the present invention.

Referring to FIG. 1, there is shown a first embodiment of a belt-type continuously variable transmission (CVT) according to the present invention. Particularly, FIG. 1 shows a control system of the belt-type CVT.

As shown in FIG. 1, the belt-type CVT comprises a driving pulley 10 which integrally rotates with an input shaft 2 driven by a drive mover such as an internal combustion engine, a driven pulley 20 which integrally rotates with an output shaft 2, and an endless metal belt 3 which is wound around the driving pulley 10 and the driven pulley 20 so as to transmit a driving force from the driving pulley 20 to the driven pulley 20. The driving pulley 10 comprises a fixed pulley 10a which is integral with the input shaft 1, and a movable pulley 11 which is movable along an axial direction of the input shaft 1 and which integrally rotates with the input shaft 1. The driven pulley 20 comprises a fixed pulley 20a which is integral with the output shaft 2, and a movable pulley 21 which is movable along an axial direction of the output shaft 2 and which integrally rotates with the output shaft 2. Winding radii (or effective pulley diameter) of the metal belt 3 around the respective driving and driven pulleys 10 and 20 are varied according to the axial movement quantities of the movable pulleys 11 and 21, and the continuous variation of the transmission ratio is realized by this variations of the winding radii.

As is clearly shown in FIG. 1, a collar member 13 is integrally connected to the movable pulley 11, and a piston member 14 is disposed on an outer surface of the collar member 13 so that an inside surface of an outer portion of the piston member 14 is sealingly and slidably movable on an outer surface of the collar member 13 along the axial direction. Further, an inner portion of the piston member 14 is disposed on a cylindrical surface 11a of the movable pulley 11 so as to be sealingly and slidably movable on the cylindrical surface 11a along the axial direction. That is, the movable pulley 11, the collar member 13 and the piston member 14 define a transmission piston chamber 12. A first partition wall 15 is provided around the input shaft 1. The first partition wall 15 and a bearing 17 supported by a not-shown housing restricts the axial movement of the piston member 14 directed toward the left hand side in FIG. 1.

A second partition wall 16 is integrally connected at an end portion of the cylindrical surface 11a of the movable pulley 11. An outer peripheral portion of the second partition wall 16 is sealingly contacted with the inner surface 15a of the first partition wall 15 so as to be slidably movable along the axial direction.

In the driven pulley 20, a part as same as the collar member 13 of the driving pulley 10 is used as a collar member 23 for constructing a transmission piston chamber 22 and a clamp piston chamber 19 of the movable pulley 21. Further, a part as same as the piston member 14 of the driving pulley 10 is used as a piston member 24, and parts as same as the first and second partition walls 25 and 26 are used as third and fourth partition walls 25 and 26. Therefore, an effective cross sectional area of the clamp piston chamber 9 of the driving pulley 10, at which a force for pushing the movable pulley 11 is generated, is equal to an effective cross sectional area of the clamp piston chamber 19 of the driven pulley 20. Further, an effective cross sectional area of the transmission piston chamber 12 of the driving pulley 10, at which a force for moving the movable pulley 11 is generated, is equal to an effective cross sectional area of the transmission piston chamber 22 of the driven pulley 20. A coil spring 70 is provided in the transmission chamber 22a and generates a preload for clamping the endless metal belt 3 between the fixed pulley 20a and the movable pulley 21 of the driven pulley 20.

Next, the construction of a hydraulic circuit of the belt-type CVT will be explained.

A pump 40 is driven by an electric motor 45. A pressure switch 49, an accumulator 48 and a pressure reducing valve 46 for setting a pulley clamping force are connected to a clamping-pressure passage 42 connected to an outlet port of the pump 40 through a check valve 43.

The pressure reducing valve 46 comprises an inlet port 46a, a drain port 46b and an output port 46c. The pressure reducing valve 46 executes a switching between the supply of the hydraulic pressure from the output port 46c to a driving-pulley clamping-pressure passage 31 and a driven-pulley clamping-pressure passage 32 and the drain of the hydraulic pressure from the driving-pulley and driven-pulley clamping-pressure passages 31 and 32. That is, the outlet port 46c of the pressure reducing valve 46 is fluidly communicated with the clamp piston chamber 9 through the driving-pulley clamping-pressure passages 31, a first inner passage 33 in the input shaft 1 and a second inner passage 34 in the input shaft 1 in the order of mention. Further, the outlet port 46c of the pressure reducing valve 46 is fluidly communicated with the clamp piston chamber 9 through the driven-side clamping-pressure oil passage 32, a first inner passage 35 in the output shaft 2 and a second inner passage 36 in the output shaft 2 in the order of mention.

A pump 50 is driven by an engine and discharges hydraulic pressure through a transmission-pressure passage 52 connected to an outlet port of the pump 50. The transmission-pressure passage 52 is connected to a transmission-ratio control valve 54 through a relief valve 53. The transmission-ratio control valve 54 is of a 3-position and 4-port selector valve and comprises an inlet port 54a, a drain port 54b, first and second inlet-outlet ports 54c and 54d. The transmission-ratio control valve 54 controls the supply of hydraulic pressure to a driving-side transmission-pressure passage 55 and a driven-side transmission-pressure passage 56 and the drain of the hydraulic pressure from the driving-side and driven-side transmission-pressure passages 55 and 56. The second inlet-output port 54d of the transmission-ratio control valve 54 is fluidly communicated with the transmission piston chamber 12 through the driving-side transmission-pressure passage 55, a first passage 57 in the input shaft 1 and a second passage 58 in the driving-side movable pulley 11. Further, the first inlet-output port 54c of the transmission-ratio control valve 54 is fluidly communicated with the transmission piston chamber 22 through the driven-side transmission-pressure passage 56, a first passage 37 in the input shaft 1 and a second passage 39 in the driven-side movable pulley 22. A strainer 60 is connected to inlet passages 41 and 51 of the respective pumps 40 and 50 so that filtered hydraulic oil is supplied to the pumps 40 and 50.

Subsequently, the operation of the belt-type CVT according to the present invention will be discussed.

A set pressure of the pressure reducing valve 46 is varied according to a signal indicative of an engine throttle opening and a signal indicative of a full braking. More specifically, the set pressure is set so as to increase according to the increase of the throttle opening and to increase when the full braking indicative signal is detected. Further, when a torque sensor is provided in the vehicle equipped with the CVT, the set pressure is controlled according to a signal from the torque sensor. The pressure reducing valve 46 supplies the hydraulic pressure substantially controlled at the set pressure to the clamp piston chambers 9 and 19.

The accumulator 48 accumulates a hydraulic pressure which is higher than a maximum pressure of the clamping force set pressure, and the hydraulic pressure of the accumulator 48 functions as a supply pressure to the pressure reducing valve 46.

Since the axial movements of the partition walls 15 and 25 are restricted by the bearings 17 and 27, respectively, the load controlled by the pressure reducing valve 46 is supplied to the clamp piston chambers 9 and 19, and applied to the movable pulleys 11 and 21, as a clamping force for clamping metal belt 3.

The pressure reducing valve 46 controls the outputted hydraulic pressure so as to be maintained at the set pressure. However, the hydraulic pressure of the accumulator 48, which is a hydraulic source supplied to the pressure reducing valve 46, is gradually lowered due to leakages from sealing portions of the clamp piston chamber 9 and 19. Accordingly, when the accumulator pressure becomes smaller than a predetermined value, the pressure switch 39 outputs a start command for turning on the electric motor 45 to the electric motor 45. In reply to this start command, the electric motor 45 drives the pump 40 at a predetermined speed, and the generated hydraulic pressure of the pump 40 is accumulated in the accumulator 48 through the check valve 43. Then, when the hydraulic pressure of the accumulator 48 becomes higher than the predetermined value, the pressure switch 49 outputs a stop command for turning off the electric motor 45 to the electric motor 45. That is, the pump 40 driven by the electric motor 45 intermittently works so as to output oil needed for supplementing the leaked oil.

In the transmission (shifting) process of the belt-type CVT, both of movable pulleys 11 and 21 move along the axial direction by an equal movement quantity, but the moving directions are opposite to each other. Further, since the effective cross sectional areas of the clamp piston chambers 9 and 19 are equalized, the sum of the volumes of the respective clamp piston chambers 9 and 19 is constant even during the transmission process. That is, the sum of the volume before the transmission operation is equal to the sum of the volumes after the transmission operation. Accordingly, even during the transmission operation, the pump 40 may executes only an intermittent work for delivering an oil quantity needed for supplementing the leaked oil.

In contrast to this, a conventional hydraulic control of a belt-type CVT has required a work for supplementing a piston stroke of a movable pulley executed at a high pressure needed for claiming the metal belt. Accordingly, the belt-type CVT according to the present invention largely decreases the work of the pump as compared with the work of the pump in the conventional CVT.

Further, the belt-type CVT according to the present invention does not employ a method for relieving the hydraulic pressure of the pump to control the set pressure as shown in U.S. Pat. No. 5,295,915 wherein the belt clamp pressure is set by using a torque cam. Accordingly, the belt-type CVT according to the present invention is capable of suppress the discharge loss of the pump and thereby decreasing the work of the pump. Further, since it is not necessary to arrange a torque cam and the driving-side movable pulley in series, the axial dimension of the CVT is suppressed. Furthermore, since the hydraulic pressure in the clamp piston chambers 9 and 19 is basically a static hydraulic pressure, the CVT according to the present invention performs the high responsibility of controlling the hydraulic pressure after the set-pressure varying command is outputted during a sudden change of the torque, and therefore the slipping of the belt is easily avoided.

Next, the transmission control of the belt-type CVT according to the present invention will be discussed.

In reply to the determination of a present transmission ratio according to a shift map based on the vehicle speed and the engine speed, a command for varying the transmission ratio at the determined transmission ratio is outputted to the transmission-ratio control valve 54.

The transmission-ratio control valve 54 is of a 3-stage and 4-port selector valve. Accordingly, when the transmission ratio is set at a high-gear side, the port 54a, which is connected to the transmission-pressure passage 52 of the pump 50, is connected to the port 54d, which is connected to the passage 55, and the drain port 54b is connected to the port 54c, which is connected to the passage 56. By these connections, the hydraulic pressure of the transmission piston chamber 12 connected to the port 54d is increased, and the hydraulic pressure of the transmission piston chamber 22 connected to the port 54b is decreased.

Since the effective cross sectional areas of the transmission piston chambers 12 and 22 are equally designed, the movable pulleys 11 and 21 are moved in the right hand direction in FIG. 1. Accordingly, the effective winding radius of the metal belt 3 around the driving side pulley 10 is increased and the effective winding radius of the metal belt 3 around the driven side pulley 20 is decreased. This sets the transmission ratio at a high-gear condition.

When the transmission ratio is set at a low-gear side, the port 54c connected to the passage 37 of the driven side is connected to the port 54a, and the port 54d connected to the passage 55 of the driving side is connected to the drain port 54b. Then, it is determined whether the actual transmission ratio reaches the target transmission ratio, by detecting the rotation speeds of the input and output shafts 1 and 2. On the basis of this determination, the connection between the port 54c of the transmission-ratio control valve 54 and the port 54a and the connection between the port 54d and the drain port 54b are properly controlled.

A force for clamping the metal belt 3 is controlled by the operation of the pressure reducing valve 46 for setting the clamping pressure. Therefore, the pressure needed for completing the shifting (transmission operation) may be smaller than 1 Mpa. This decreases the work quantity of the pump 50.

With the thus arranged belt-type CVT of the first embodiment according to the present invention, the following advantages are obtained.

The conventional CVT has been arranged such that a torque cam mechanism is provided at an engine-side portion of the input shaft and controls the clamping force according to the input torque. Therefore, it has been necessary to construct a complicated structure in the input shaft and to increase the axial dimension due to this provision.

In contrast to this conventional arrangement, the first embodiment according to the present invention is arranged such that the driving-pulley clamping-pressure passage 31 and the driven-pulley clamping-pressure passage 32 are fluidly communicated with each other and are arranged to receive the hydraulic pressure controlled by the pressure reducing valve 46 according to the input torque. Accordingly, it is not necessary to provide a complicated structure on the input shaft 1 and to elongate the input shaft 1 since the belt-type CVT according to the present invention does not require such a complicated structure.

Further, the belt-type CVT of the first embodiment is arranged such that the accumulator 48 is disposed between the pump 40 and the pressure reducing valve 46, and that the check valve 43 is disposed between the pump and the accumulator 48. By these arrangements, when the hydraulic pressure is supplied from the pump 40 to the clamping-pressure passages 31 and 32, the hydraulic pressure is accumulated in the accumulator 48. Further, when the pressure in the accumulator 48 becomes higher than the predetermined value, the operation of the pump 40 is stopped according to the stop command of the pressure switch 49, and the check valve 43 stops the hydraulic pressure to return the pump 40. Although the hydraulic pressure supplied to the clamp piston chamber 9 and 19 is controlled by the pressure reducing valve 46, the hydraulic pressure for such a control is supplied from the accumulator 48 and does not require the operation of the pump 40.

Further, the pressure switch 49 for outputting the signal indicative of the pressure in the accumulator 48 is connected to the clamping-pressure passage 42 between the check valve 43 and the accumulator 48. Accordingly, when it is detected that the hydraulic pressure of the accumulator 48 is smaller than the predetermined pressure, the command signal for driving the pump 40 to the electric motor 45 is outputted from the pressure switch 49 to the pump 40. That is, the hydraulic system of the belt-type CVT according to the present invention basically operates to maintain the hydraulic pressure of the clamp piston chambers 9 and 19 by means of the hydraulic pressure of the accumulator 48, and when the hydraulic pressure of the accumulator 48 is gradually decreased due to the leakages at the sealing portions of the clamp piston chambers 9 and 19, the pump 40 works so as to supplement the leaked quantity of the hydraulic pressure. This arrangement largely decreases the work quantity of the pump 40.

Furthermore, according to the present invention, the effective cross sectional areas of the transmission piton chambers 12 and 22 are arranged to be equal with each other, and the hydraulic pressure from the one hydraulic source is supplied to a hydraulic circuit through the transmission-ratio control valve 54 of a three-stage selector valve. That is, when the transmission ratio is varied toward the decelerating side, the effective winding radius at the driving side pulley 10 is decreased and the effective winding radius at the driven side pulley 20 is increased.

During this operation, only the volume of hydraulic oil for the transmission piston chambers 12 and 22 may be controlled since the effective cross-sectional areas of the driving-side and the driven-side transmission piston chambers 12 and 22 are designed to be equal with each other. Thus, by executing the transmission control by means of a three-position selector valve, it becomes possible to simultaneously control the both pulley diameters of the driving-side and the driven-side pulleys 10 and 20 by means of one hydraulic source and one selector valve. This arrangement improves the belt type CVT in transmission responsibility.

Figure 2:
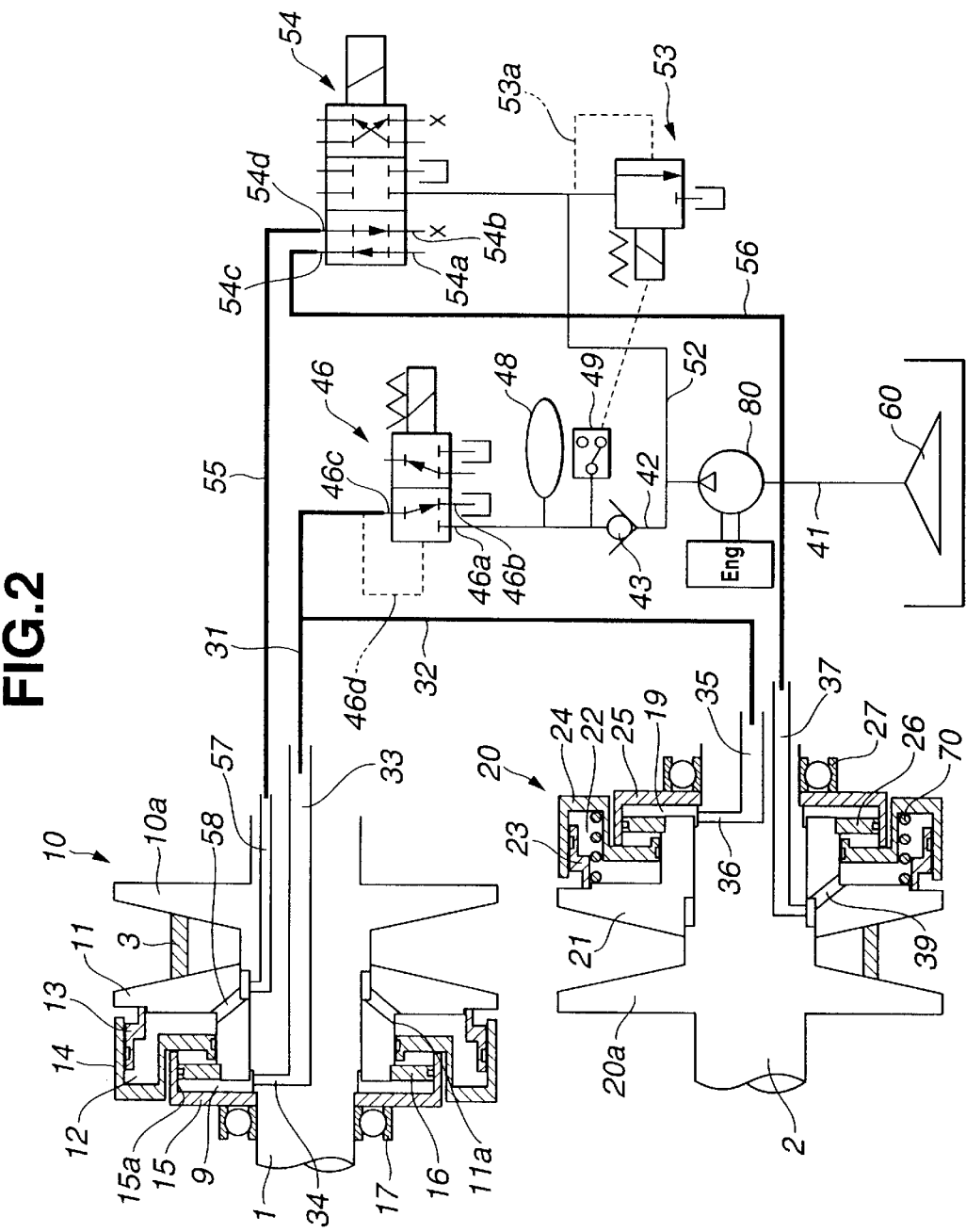
FIG. 2 is a hydraulic circuit diagram showing a control system of the belt-type CVT according to a second embodiment of the present invention.

Referring to FIG. 2, there is shown a second embodiment of the belt-type CVT according to the present invention. Particularly, FIG. 2 shows a control system of the belt-type CVT.

As shown in FIG. 2, a pump 80 is driven by the engine. The clamping-pressure passage 42 is connected to a discharge port of the pump 80 and is connected to the accumulator 48 through the check valve 43. A transmission-pressure passage 52 is connected to the outlet port of the pump 80 and is connected to a relief valve 53.

When the hydraulic pressure of the accumulator 48 is higher than a first predetermined value PH, the pressure switch 49 outputs a first command for setting a set value of the relief valve 53 at a low pressure needed for executing the transmission control.

Since the clamping-pressure passage 42 of the pump 80 is shut off by check valve 43, the pump 80 executes a work as a hydraulic source for the transmission-ratio control valve 54. On the other hand, when the hydraulic pressure of the accumulator 48 becomes lower than a second predetermined value PL, the pressure switch 49 outputs a second command for setting the set value of the relief valve 53 at a high pressure higher than the maximum set pressure of the pressure reducing valve 46 for setting the clamp pressure. By this maximum setting of the set value, the high-pressured hydraulic pressure of the pump 80 opens the check valve 43 and is supplied to the accumulator 48. Then, when the pressure switch 49 again detects that the hydraulic pressure of the accumulator 48 is higher than the first predetermined value PH, the pressure switch 49 outputs the first command to the relief valve 53 so as to set the set value at the low pressure value. With this arrangement, it becomes possible that the second embodiment ensures the same functions as the first embodiment performs.

As explained above, the second embodiment according to the present invention is arranged such that the transmission-pressure passage 52, which is capable of supplying the hydraulic pressure to the transmission piton chambers 12 and 22 through the relief valve 53 capable of desirably setting the set hydraulic pressure, is disposed between the pump 80 and the check valve 43. Further, when the pressure switch 49 detects that the accumulator pressure is higher than the predetermined pressure PH, the set pressure of the relief valve 53 is set at the value lower than the accumulator set value. Due to the lower setting of the relief valve 53, the hydraulic pressure supplied from the pump 80 is only supplied to the transmission-pressure passage 52. The reason why the transmission operation does not require a high hydraulic pressure is that the clamp force for clamping the belt 3 has already been ensured by the hydraulic pressure of the accumulator in the lower setting condition.

Furthermore, when the pressure switch 49 detects that the accumulator pressure is lower than the second predetermined pressure PL, the set pressure of the relief valve 53 is set at the value higher than the accumulator set pressure. By this higher setting of the relief valve 53, the hydraulic pressure supplied from the pump 80 is supplied to both of the clamping-pressure passage 42 and the transmission-pressure passage 52. Accordingly, the clamping-pressure control and the transmission-pressure control are properly achieved using the one pump 80.

Figure 3:
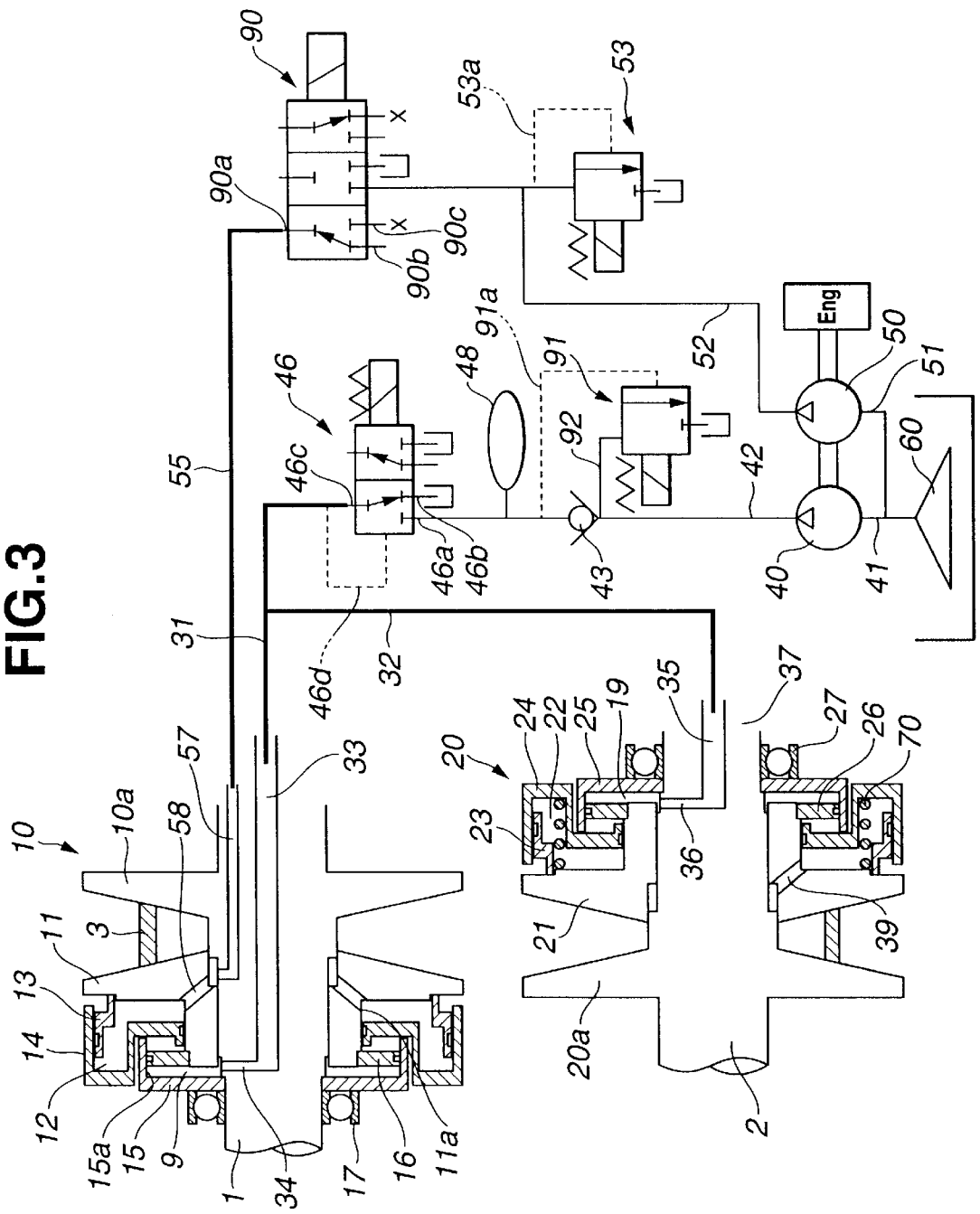
FIG. 3 is a hydraulic circuit diagram showing a control system of a belt-type CVT according to a third embodiment of the present invention.

Referring to FIG. 3, there is shown a third embodiment of the belt-type CVT according to the present invention. Particularly, FIG. 3 shows a control system of the belt-type CVT. The arrangement of the third embodiment is basically the same as that of the first embodiment, except that both of pumps 40 and 50 are driven by the engine, that an unload valve 91 is disposed instead of the pressure switch, and that a transmission pressure control valve 90 of a 3-port and 3-position servo valve 90 is employed instead of the transmission-ratio control valve 54, and that only the transmission piston chamber 12 of the driving-side movable pulley 11 is hydraulically controlled.

The function of the specifically arranged portions of the third embodiment will be discussed hereinafter.

When the hydraulic pressure of the accumulator 48 is higher than a predetermined pressure, the unload valve 91 operates to connect an oil passage 91a and a drain port of the unload valve 91 so that the hydraulic pressure outputted from the pump 40 is drained. Therefore, under this condition, the pump 40 is in no-load condition. On the other hand, when the hydraulic pressure of the accumulator 48 is lower than the predetermined pressure, the unload valve 91 operates to close the connection between the oil passage 91a and the drain port. Therefore, the hydraulic pressure of the pump 40 is accumulated in the accumulator 48. Thereafter, when the hydraulic pressure of the accumulator 48 again becomes higher than the predetermined pressure, the unload valve 91 operates to drain the hydraulic pressure outputted from the pump 40.

The transmission ratio control is executed by controlling a connection state between the transmission ratio control valve 90 and the pump 50. More specifically, the control is executed by determining whether a port 90a of the transmission ratio control valve 90 communicated with the transmission piston chamber 12 is connected to a port 90b communicated with the transmission-pressure passage 52 of the pump 50 or with a drain port 90c.

With this arrangement for the transmission ratio control according to the third embodiment of the present invention, it becomes possible to responsively accumulate the hydraulic pressure in the accumulator without using an electric motor.

As explained above, the third embodiment is arranged such that only the driving-side transmission-pressure passage 55 for supplying hydraulic pressure to the driving-side transmission piston chamber 12 is provided while the passage for the driven-side transmission piston chamber 22 is eliminated. Further, there is provided the transmission-pressure passage 52 for supplying the hydraulic pressure from the one hydraulic source through the serve valve 90 (which is capable of desirably setting the hydraulic pressure) on the driving side transmission pressure oil passage 55. That is, the clamp pressure for clamping the belt 3 is ensured by the clamp piston chambers 9 and 19. Accordingly, by independently controlling the driving side transmission pressure oil passage 55 by means of the servo valve 90, by providing the elastic member 70 for generating a predetermined pressing force in the driven side transmission piston chamber 22, and by controlling the hydraulic pressure of the driving side transmission piston chamber 12, the transmission control is achieved. This arrangement facilitates the construction of the control system of the belt-type CVT.

The entire contents of Japanese Patent Application No. 2001-133658 filed on Apr. 27, 2001 in Japan are incorporated herein by reference.

Although the invention has been described above by reference to certain embodiments of the invention, the invention is not limited to the embodiments described above. Modifications and variations of the embodiment described above will occur to those skilled in the art, in light of the above teaching. For example, since the hydraulic pressure in the piston chambers 9 and 19 are basically static hydraulic pressure, the needed hydraulic pressure may be generated by applying a load to a completely (firmly) sealed master cylinder like as a brake system, instead of employing the accumulated pressure of the accumulator 48 as the supply pressure. The scope of the invention is defined with reference to the following claims.

What is claimed is:

1. A belt-type continuously variable transmission comprising:
   a driving pulley having a driving-side transmission piston chamber and a driving-side clamp piston chamber;
   a driven pulley having a driven-side transmission piston chamber and a driven-side clamp piston chamber;

an endless belt wound around the driving pulley and the driven pulley so as to transmit a driving force from the driving pulley to the driven pulley;

a hydraulic circuit controlling effective pulley diameters of the driving pulley and the driven pulley relative to the belt according to vehicle condition indicative information to continuously vary a transmission ratio of the belt-type continuously variable transmission;

wherein at least one of first and second relationships is satisfied, the first relationship being that an effective cross sectional area of the driving-side transmission piston chamber is equal to an effective cross sectional area of the driven-side transmission piston chamber, and the second relationship being that an effective cross sectional area of the driving-side clamp piston chamber is equal to an effective cross sectional area of the driven-side clamp piston chamber;

wherein one of third and fourth relationships is satisfied, the third relationship being that a common passage of the hydraulic circuit fluidly communicates the driving-side transmission piston chamber and the driven-side transmission piston chamber, the fourth relationship being that the common passage fluidly communicates the driving-side clamp piston chamber and the driven-side clamp piston chamber.

2. The belt-type CVT as claimed in claim 1, wherein a clamp pressure supply passage is disposed in the hydraulic circuit, the clamp pressure supply passage supplying the hydraulic pressure from one hydraulic pressure source to the common passage through a pressure reducing valve for controlling the hydraulic pressure according to a change of an input torque.

3. The belt-type CVT as claimed in claim 2, wherein the pressure reducing valve is electrically controlled on the basis of the change of the input torque.

4. The belt-type CVT as claimed in claim 2, wherein an accumulator is disposed between a pump for generating the hydraulic pressure of the hydraulic circuit and the pressure reducing valve and in the clamp pressure passage.

5. The belt-type CVT as claimed in claim 4, wherein a check valve is disposed between the pump and the accumulator.

6. The belt-type CVT as claimed in claim 5, further comprising a pressure detecting means for outputting a signal when a pressure in the accumulator is higher than a predetermined pressure, the pressure detecting means being disposed between the check valve and the accumulator.

7. The belt-type CVT as claimed in claim 6, wherein the pressure detecting means includes one of a pressure switch and a pressure sensor.

8. The belt-type CVT as claimed in claim 6, wherein the pressure detecting means outputs an operation signal to the pump when the pressure in the accumulator is lower than a second predetermined value.

9. The belt-type CVT as claimed in claim 2, wherein an accumulator is disposed between a pump for generating a hydraulic pressure of the hydraulic circuit and the pressure reducing valve and in the clamp pressure passage, a check valve being disposed between the pump and the accumulator, an unload valve being disposed in the clamp pressure passage, the unload valve unloading the pump when the pressure in the accumulator is higher than a predetermined pressure, the unload valve being disposed in the clamp pressure passage.

10. The belt-type CVT as claimed in claim 2, wherein a transmission pressure passage for supplying the hydraulic pressure to the driving-side and driven-side transmission piston chambers is disposed between a pump of the hydraulic circuit and a check valve through a pressure controlling means for varying the hydraulic pressure at a desired pressure.

11. The belt-type CVT as claimed in claim 10, wherein the pressure control means includes one of a relief valve and a pressure control valve.

12. The belt-type CVT as claimed in claim 10, wherein the pressure detecting means outputs a first signal for setting a set pressure of the pressure controlling means at a first pressure lower than a set pressure of the accumulator when the accumulator pressure is higher than a first predetermined pressure, and the pressure detecting means outputs a second signal for setting the set pressure of the pressure controlling means at a second pressure higher than the set pressure of the accumulator when the accumulator pressure is lower than a second predetermined pressure.

13. The belt-type CVT as claimed in claim 1, wherein at least one of a driving-side transmission pressure passage for supplying the hydraulic pressure to a driving-side transmission piston chamber and a driven-side transmission pressure passage for supplying the hydraulic pressure to a driven-side transmission piston chamber is disposed in the hydraulic circuit, and a transmission pressure passage for supplying the hydraulic pressure from the pump through a transmission ratio control valve for desirably setting the hydraulic pressure is disposed in at least one of the driving-side transmission pressure passage and the driven-side transmission pressure passage.

14. The belt-type CVT as claimed in claim 1, wherein the hydraulic circuit comprising:

a driving-side transmission pressure passage for supplying the hydraulic pressure to the driving-side transmission piston chamber;

a driven-side transmission pressure passage for supplying the hydraulic pressure to the driven-side transmission piston chamber; and a three-position selector valve disposed in the transmission pressure supply passage, the three-position selector valve selectively taking one of first, second and third states, the hydraulic pressure being supplied to the driving-side transmission pressure passage and being drained from the driven-side transmission pressure passage when the three-position selector valve takes the first state, the hydraulic pressure being supplied to the driven-side transmission pressure passage and being drained from the driving-side transmission pressure passage when the three-position selector valve takes the second state, both of the driving-side transmission pressure passage and the driven-side transmission pressure passage being shut off from the hydraulic pressure when the three-position selector valve takes the third state;

wherein the effective cross sectional area of the driving-side transmission piston chamber is equal to the effective cross sectional area of the driven-side transmission piston chamber.

15. A belt-type continuously variable transmission comprising:

a driving pulley having a driving-side transmission piston chamber and a driving-side clamp piston chamber;

a driven pulley having a driven-side transmission piston chamber and a driven-side clamp piston chamber, an effective cross sectional area of the driving-side transmission piston chamber being substantially equal to an effective cross sectional area of the driven-side transmission piston chamber, an effective cross sectional area of the driving-side clamp piston chamber being substantially equal to an effective cross sectional area of the driven-side clamp piston chamber;

a belt wound around the driving pulley and the driven pulley;

a hydraulic circuit controlling effective pulley diameters of the driving pulley and the driven pulley relative to the belt according to vehicle condition indicative information to continuously vary a transmission ratio of the belt-type continuously variable transmission, a common passage of the hydraulic circuit establishing one of a first fluid communication between the driving-side transmission piston chamber and the driven-side transmission piston chamber and a second fluid communication between the driving-side clamp piston chamber and the driven-side clamp piston chamber.

* * * * *